US010984123B2

(12) United States Patent
Meng et al.

(10) Patent No.: US 10,984,123 B2
(45) Date of Patent: Apr. 20, 2021

(54) ON-LINE TRANSMISSION AND CONTROL OF GEOGRAPHIC DECLARATION DATA

(71) Applicant: International Business Machines Corporation, Armonk, NY (US)

(72) Inventors: Fan Frank Meng, Singapore (SG); Jayavel Rajendran, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/214,828

(22) Filed: Dec. 10, 2018

(65) Prior Publication Data

US 2020/0184092 A1 Jun. 11, 2020

(51) Int. Cl.
| | |
|---|---|
| *G06F 21/62* | (2013.01) |
| *G06F 16/29* | (2019.01) |
| *G06F 21/60* | (2013.01) |
| *H04L 9/32* | (2006.01) |
| *H04W 12/00* | (2021.01) |

(52) U.S. Cl.
CPC .......... *G06F 21/6218* (2013.01); *G06F 16/29* (2019.01); *G06F 21/602* (2013.01); *H04L 9/3268* (2013.01); *H04W 12/00503* (2019.01)

(58) Field of Classification Search
CPC .... G06F 21/6218; G06F 21/602; G06F 16/29; H04L 9/3268
USPC ...... 713/160, 176, 182, 193; 726/2, 7, 9, 28, 726/29
See application file for complete search history.

(56) References Cited

U.S. PATENT DOCUMENTS

| 8,365,243 B1 | 1/2013 | Lu et al. |
|---|---|---|
| 8,635,192 B2 | 1/2014 | Klassen et al. |
| 9,654,922 B2 * | 5/2017 | Ronca .................. H04L 63/107 |
| 2011/0009159 A1 | 1/2011 | Muzina et al. |

(Continued)

FOREIGN PATENT DOCUMENTS

EP 2541438 1/2013

OTHER PUBLICATIONS

"Boundary Control in the Cloud: Geo-Tagging and Asset Tagging"—Castro-Leon et al, Open Access, Mar. 27, 2014 https://link.springer.com/book/10.1007/978-1-4302-6146-9 (Year: 2014).*
Anonymous, "TCP geotag", ip.com Technical Disclosure No. IPCOM000233549D (2013).

(Continued)

*Primary Examiner* — Randy A Scott
(74) *Attorney, Agent, or Firm* — Jeffrey S. LaBaw; Jack V. Musgrove (57) ABSTRACT

A method is presented to geographically control the distribution of protected data and ensure that it is not transmitted along any path which would encompass prohibited areas. A user wanting to so protect data can input geographic restrictions which are translated into geodeclaration metadata representing one or more geographic areas in which the data is either permitted or prohibited. The metadata may be in the form of an XML statement, and is sealed with the data using a digital certificate. When the data is received at a network router or at a destination device, the router/device can check its own current location (e.g., via GPS) and determine whether its location is within permissible boundaries. If not, the data is not transmitted or stored, and an error message is returned. If the router/device determines that it is within permissible boundaries, it proceeds to transmit or store the data.

11 Claims, 6 Drawing Sheets

(56) References Cited

U.S. PATENT DOCUMENTS

| | | | |
|---|---|---|---|
| 2011/0231645 A1* | 9/2011 | Thomas | H04L 9/3236 |
| | | | 713/150 |
| 2011/0314298 A1* | 12/2011 | Zimmer | G06F 21/57 |
| | | | 713/189 |
| 2013/0305044 A1 | 11/2013 | Gutt et al. | |
| 2015/0134851 A1 | 5/2015 | Relan et al. | |
| 2016/0021238 A1* | 1/2016 | Abramson | G06F 3/013 |
| | | | 455/418 |
| 2016/0094669 A1 | 3/2016 | Karampurwala et al. | |
| 2016/0357994 A1* | 12/2016 | Kanakarajan | H04W 12/1206 |

OTHER PUBLICATIONS

Joinup, "Routing Metadata" [online], European Commission Interoperability solutions for public administrations, businesses and citizens, retrieved on Dec. 9, 2018, from the Internet URL: https://joinup.ec.europa.eu/site/isa_edocuments/edocuments/index28f2.html?page_id=405.

Libvirt, "Network XML format" [online], retrieved on Dec. 9, 2018, from the Internet URL: https://libvirt.org/formatnetwork.html.

National Archives of Australia, "Outsourcing digital storage" [online], retrieved on Dec. 9, 2018, from the Internet URL: http://www.naa.gov.au/information-management/managing-information-and-records/storing/outsourcing-data-storage/index.aspx (2018).

Openstack, "Quantum MidoNet Plugin" [online], retrieved on Dec. 9, 2018, from the Internet URL: https://wiki.openstack.org/wiki/Spec-QuantumMidoNetPlugin.

Salih, Ammar J., "Enhancing Location Based IP Services", [online], retrieved on Dec. 31, 1999 from the Internet URL: https://tools.ietf.org/html/draft-add-location-to-ipv6-header-01 (May 2013).

* cited by examiner

ON-LINE TRANSMISSION AND CONTROL OF GEOGRAPHIC DECLARATION DATA

BACKGROUND OF THE INVENTION

Field of the Invention

The present invention generally relates to transmission of electronic data, and more particularly to a method of controlling the distribution of electronic data in a network.

Description of the Related Art

Data is moving around the world faster than ever thanks to advances in networking technologies such as wireless and satellite communications, and the Internet. As these networks are used to convey ever more sensitive data, it has become crucial to provide security mechanisms to ensure the reliability and integrity of the data, as well as guarding against unauthorized access. The simplest form of network security is a basic authentication protocol like the use of a login name or identifier combined with a password. More advanced network security techniques rely on various forms of encryption. One such technique involves digital certificates issued by a certificate authority. A digital certificate is an electronic document used to prove the ownership of a public cryptography key. The certificate includes information about the key, information about the identity of its owner, and a digital signature of an entity that has verified the certificate's contents (the issuer). The owner of the key may be a person or an organization, or a device such as a computer receiving data via, e.g., a transport layer security protocol (previously known as a secure sockets layer).

There has also been a growing concern regarding the physical location of data, particularly for service providers of data storage in cloud or traditional infrastructure. There are an increasing number of laws or directives regarding physical data placement, e.g., confirming information about the geographic location of data that is stored for customers. One method of determining geo-location of internet traffic is through the use of the Regional Internet Registry database, but this information is not very accurate as it depends on how an internet service provider registers its Internet Protocol (IP) subnets, that is normally done in a country/city format. A more recent approach is known as geotagging. Geotagging is the process of adding geographical identification information to data (files, database, etc., residing in volatile memory or in permanent storage). This information can be latitude and longitude coordinates, and can additionally include altitude, distance, place names, etc. It has been proposed to add a geotag using the Transport Control Protocol (TCP), e.g., as a TCP header option.

SUMMARY OF THE INVENTION

The present invention in at least one embodiment is generally directed to a method of controlling the distribution of electronic data generated at a user computer system, by receiving a command to restrict geographic use of the electronic data, responsively adding geographic metadata to the electronic data including at least one geographic boundary defining a geographic area, securing the geographic metadata with the electronic data using a cryptographic seal such that a recipient device can verify authenticity of the geographic metadata, and then transmitting the sealed electronic data and geographic metadata from the user computer system to the recipient device. The user computer system can optionally first confirm that the recipient device is located at a permissible physical location. The geographic area may be a region in which the electronic data is allowed to be used, or a region in which the electronic data is prohibited. The geographic metadata can include multiple geographic boundaries defining multiple separate geographic areas. In the illustrative implementation, the geographic metadata is an extensible markup language document having a verifiable signature for the electronic data, and the cryptographic seal uses a digital certificate obtained from a certificate authority.

In the case where the recipient device is a network router, the router verifies the authenticity of the cryptographic seal and confirms that a physical location of the router is within the geographic area before transmitting the sealed electronic data and geographic metadata on to another device according to destination information included with the data transmission. The router preferably has an embedded geo agent which determines that the geographic metadata is associated with the electronic data and enforces the geographic restrictions. The router can also optionally confirm that the destination (or next network node) is located at a permissible physical location before transmitting. When the destination device receives the sealed electronic data and geographic metadata from a router, it can similarly verify the authenticity of the cryptographic seal and confirm that its physical location is within the geographic area before storing the electronic data locally. The router as well as the destination device can confirm their own locations using co-located global positioning systems.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

A number of considerations directly affect geographic localization of electronic data, particularly legal reasons. For example, different jurisdictions may have different privacy laws that apply to information stored within the jurisdiction, even if the information did not originate there. Storing information in one jurisdiction versus another may accordingly lead to a breach of these provisions, exposing one or more parties to severe liability. Security requirements (private or governmental) may likewise create location issues. These difficulties present a challenge not only to service providers such as cloud processing and storage, but also to network equipment suppliers. The problem can be exacerbated by the sheer magnitude of the geography involved. Data often needs to be transmitted from one location to a remote site on the other side of the world, raising the possibility of circuitous transmission along uncertain paths. While prior art geotagging imparts some knowledge of a data's source, it does not offer any way to control data transmission.

It would, therefore, be desirable to devise an improved method of transmitting electronic data in a communications network which could allow a user or network entity to ensure that protected data never enters prohibited areas during transfer or storage. It would be further advantageous if the method could ensure the data is not compromised during transmission. These and other advantages are achieved by the present invention in its various embodiments by including geodeclaration metadata with the data as it is transmitted along the network. The geodeclaration has boundary information that defines one or more geographic areas which represent either permissible locations for the data or prohibited locations. Each node along the network, as well as the final destination, can examine the geodeclaration and make a determination as to whether it is proper to receive, transmit and/or store the associated data. The metadata can be sealed with the data using conventional authentication techniques such as a certificate authority to prevent compromise. Data without geotagged declaration may be denied transition, and other actions may be taken such as sending an alert to the data owner, source or other authority.

Figure 1:
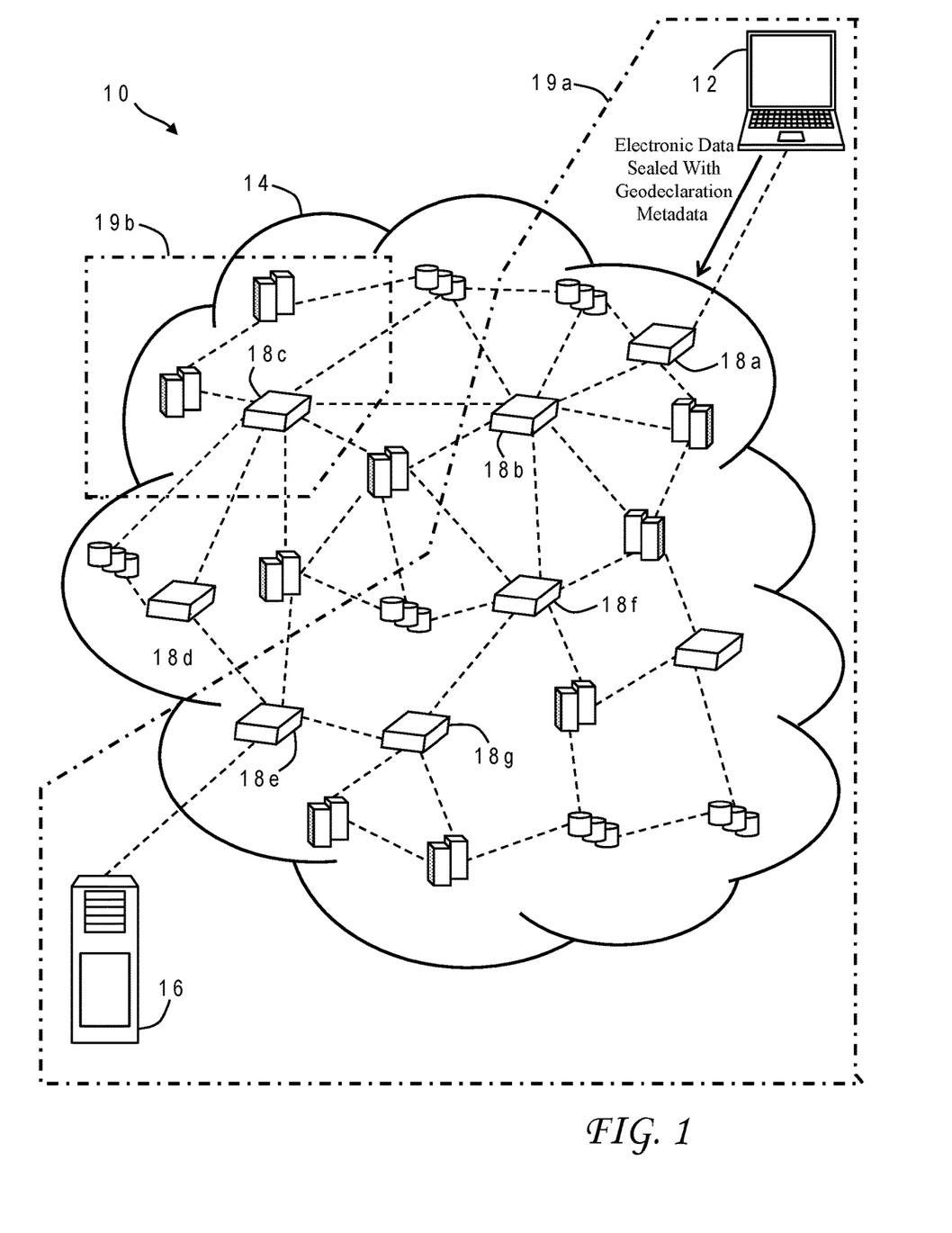
FIG. 1 is a pictorial representation of a computer network having defined geographic areas for which data placement is either permissible or prohibited in accordance with one implementation of the present invention.

With reference now to the figures, and in particular with reference to FIG. 1, there is depicted one embodiment 10 of a network environment constructed in accordance with the present invention. Network environment 10 is generally comprised of a user device 12, a network 14, and a destination device 16. User device 12 may be any type of computer system such as that described below in conjunction with FIG. 2. User device 12 may be, without limitation, a desktop computer, a laptop computer, a personal digital assistant, a cellular telephone, or a computer system integrated with an automobile or other vehicle. Destination device 16 may similarly be any kind of computer system; in the illustrative implementation, it includes permanent storage designed to hold data generated by user device 12.

Network 14 includes a multitude of nodes having various functions. Some of the nodes may offer computing services (e.g., cloud computing or web hosting), others may be storage systems such as databases, and some are network routers. A given node may be operatively interconnected to multiple nodes as indicated by the dashed lines. Network 14 may be any kind of network including but not limited to private, community, public, or hybrid networks, such as local area networks, wide area networks, or the Internet. Network environment 10 may include additional components not shown.

Several of the network routers are called out in FIG. 1 as reference numerals 18a-18e As used herein the term "network router" refers generally to any device that functions as an intermediary in conveying data from a data source (e.g., a user computer system, or a router at another network node) to a data sink (e.g., a destination device, or again a router at another network node). The present invention is applicable to any such intermediary regardless of construction, protocol, transmission medium, frequency bandwidths, etc. For example, while the present invention is conveniently described in the context of the Internet or other computer networks, it is equally applicable to cell phone communications using wireless repeaters.

As explained further below, user device 12 generates electronic data and securely seals the data along with geodeclaration metadata having boundary information representing one or more geographic areas. User device 12 desires to transmit the electronic data (sealed with the geodeclaration) to destination device 16 via network 14 in a geographically-controlled manner. In the example of FIG. 1, the geodeclaration metadata might define a geographic area as indicated by a boundary 19a. Boundary 19a designates one or more geographic areas in which the data is to be allowed to be transmitted or stored. Those skilled in the art will appreciate that the shape of boundary 19a as seen in FIG. 1 is not the actual shape of the geographic boundary, but rather is used to show which components of network environment 10 are within permissible location limits. The geographical boundary may be jurisdictional in nature but is not so confined, and it may instead refer to other practical considerations regarding the transmission of the data. In the illustrative implementation the geographic information is presented in accordance with the World Geodetic System (WGS-84), a standard definition for a global reference system for geospatial information, and the reference system for the global positioning system (GPS). However, present the invention can be practiced using other formats for geographical information, including a local coordinate system rather than global. The present invention is further not limited to a particular type of coordinate system, e.g., Cartesian, as it could for example be practiced using polar coordinates.

Further to this example, the conventional routing logic of the network routers would normally choose the following sequence of routers to deliver the electronic data from user device 12 to destination device 16: router 18a, router 18b, router 18c, router 18d, and finally router 18e. However, this transmission path includes two routers (18c and 18d) that are outside the permissible boundary 19a. Accordingly, novel logic embedded in the routers and/or user device 12 in accordance with the present invention finds the following alternate transmission path in which all of the routers used are within boundary 19a: router 18a, router 18b, router 18e, router 18g, and finally router 18e. Router 18e then transmits the electronic data to destination device 16 to complete the data transit.

While boundary 19a is inclusive, i.e., it defines an area where the data is allowed to reside, a geographic boundary according to the present invention might alternatively (or additionally) be exclusive, i.e., defining an area where the data is prohibited. One such exclusive boundary 19b is also shown in FIG. 1. Thus in an alternative example for FIG. 1, the conventional routing logic would still normally choose the same sequence of routers (18a, 18b, 18c, 18d, 18e) to deliver the electronic data from user device 12 to destination device 16, but since router 18c is in the prohibited area defined by boundary 19b, the alternative transmission path (18a, 18b, 18e, 18g, 18e) would again be used. For either of these examples, it can thus be seen that the present invention ensures the data is protected against any placement in an impermissible device. While FIG. 1 shows only one inclusive area and only one exclusive area, the geographic metadata could describe multiple areas of both types.

Figure 2:
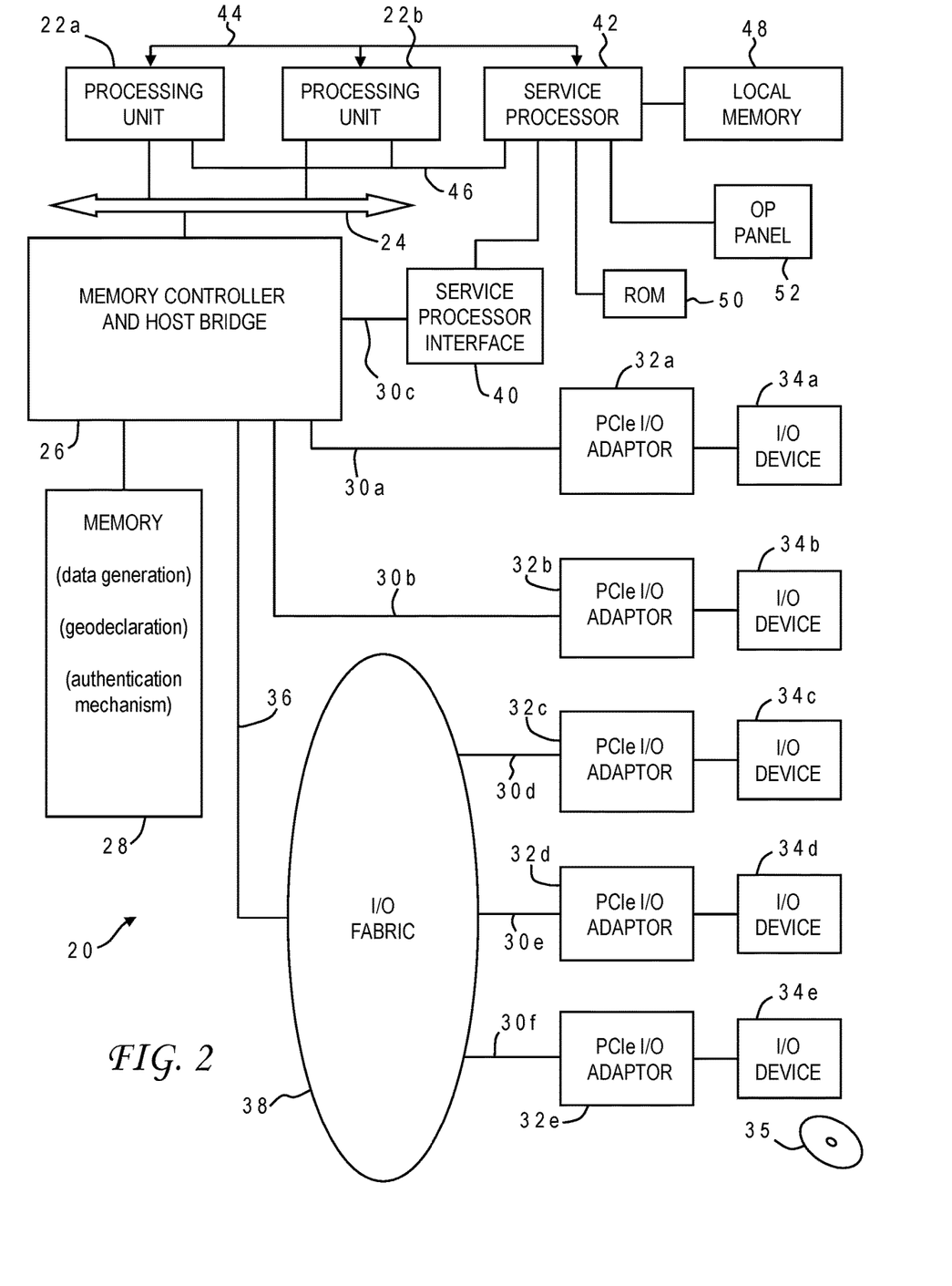
FIG. 2 is a block diagram of a computer system programmed to carry out restrictive geodeclaration of electronic data in accordance with one implementation of the present invention.

With further reference to FIG. 2, there is depicted one embodiment 20 of a computer system in which the present invention may be implemented to control geographic placement of electronic data. Computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 28 has loaded therein various applications in accordance with the present invention, including an application which generates original data, a geodeclaration module, and an authentication mechanism such as a certificate utility.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive which receives an optical disk 35 (one example of a computer readable storage medium) such as a CD or DVD, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30c connects MC/HB 26 to a service processor interface 40 to allow communications between I/O device 34a and a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications, results of which may be stored in a hard disk drive of the system (an I/O device 34). While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3A:
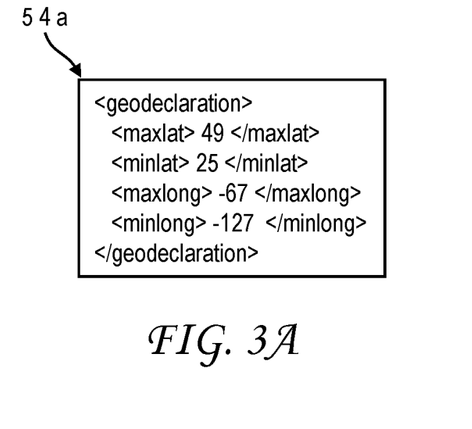
FIGS. 3A and 3B are examples of extensible markup language (XML) documents representing geodeclarations in accordance with two implementations of the present invention.
Figure 3B:
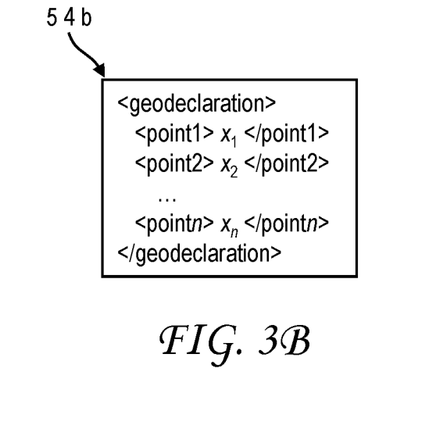

Those skilled in the art will appreciate that computer system 20 may function as a component of network environment 10, particularly user device 12 or destination device 16. Accordingly, when acting as user device 12, computer system 20 generates the original electronic data using whatever program or application is running on the system, and further checks with the user as to whether the data is to be geographically controlled. If so, computer system 20 will request the geographic restrictions from the user and construct an appropriate geodeclaration representing those restrictions. While the restrictions may be encoded in any convenient manner, the illustrative embodiment uses an extensible markup language (XML) document. Two examples of such documents are seen in FIGS. 3A and 3B. In FIG. 3A the geodeclaration 54a takes the form of four latitude/longitude metadata values comprising the boundaries of a rectangle representing an allowable area. This example uses a "maxlat" tag to identify a maximum latitude, a "minlat" tag to identify a minimum latitude, a "maxlong" tag to identify a maximum longitude, and a "minlong" tag to identify a minimum longitude. The values used in this example (maxlat=49, minlat=25, maxlong=−67, minlong=−127) form a rectangle that generally covers the continental United States. Thus the area defined by the geodeclaration does not have to be exact but can approximate a desired area. In FIG. 3B the geodeclaration 54b is a more generalized polygon described by successive points representing corners of the polygon which are used in a "connect-the-dots" manner. The starting point is identified by a tag "point_1", the second point is identified by a tag "point_2", etc., with the final point being identified by a tag "point_n", i.e., the nth point of a polygon having n corners or sides. The corresponding values $x_1, x_2, \ldots, x_n$, may be latitude/longitude pairs or other sets of local coordinates.

User device 12 thus takes the electronic data and adds the geodeclaration 54a or 54b to provide the indication of geographic restriction for the data. This combined data/metadata is then sealed with a digital certificate using conventional techniques to prevent compromise, i.e., the combination is sealed with a key provided by a trusted certificate authority (CA). A downstream device (e.g., a network router or destination device) can verify sealed data from the trusted certificate authority. The certificate authority may be from any trusted third party, such as Verisign or Mozilla. In the preferred embodiment, the sealed data further includes some details of the electronic data, i.e., a signature, in the form of a checksum or other verification information to further ensure the authenticated data to be transmitted.

User device 12 (as well as destination device 16) may itself be able to determine its own geographic location for geodeclaration purposes. The geographic information may be obtained in any conventional manner, such as using a GPS device attached to computer system 20 (i.e., one of the I/O devices 34), or based on information provided by nearby sources such as a Wi-Fi or mobile network, or a router/gateway location.

Figure 4:
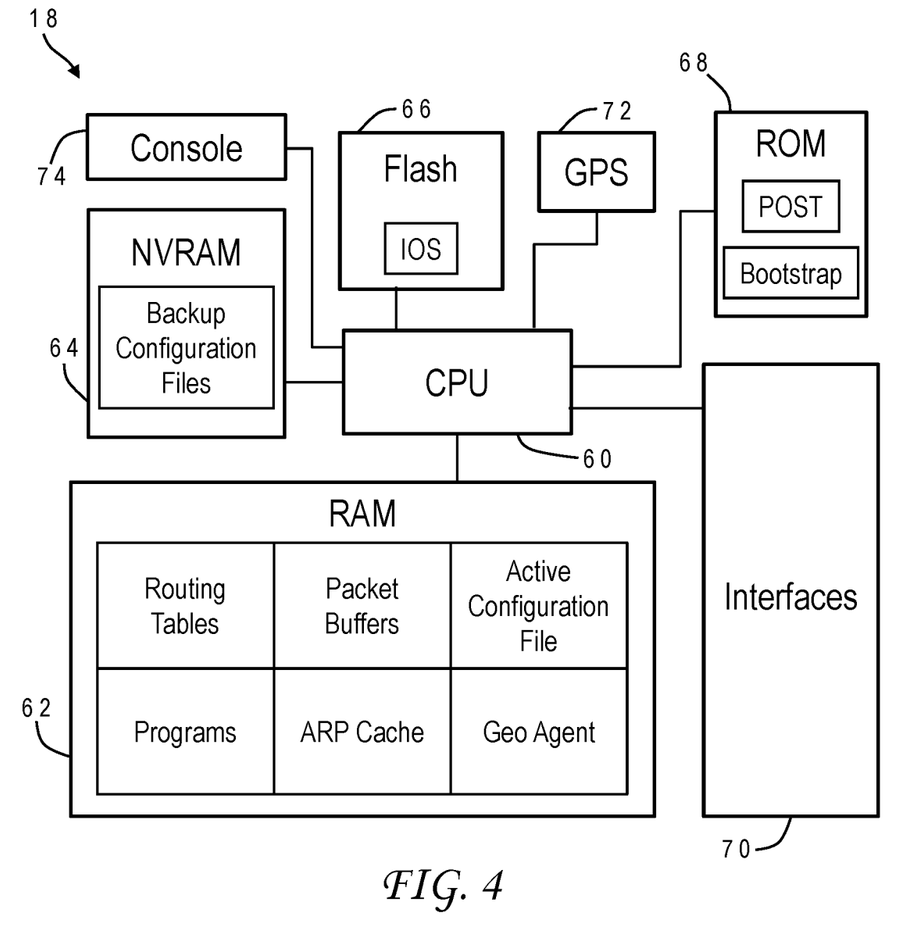
FIG. 4 is a block diagram of a network router programmed to receive and transmit electronic data having a restrictive geodeclaration in accordance with one implementation of the present invention.

Once user device 12 has added the geographic metadata and sealed it with the electronic data, it transmits the package to network 12 for transmission to destination device 16. The transmission package includes conventional destination information allowing the network routers to successively move the package along until it reaches destination device 16. A network router 18 in accordance with one implementation of the present invention is seen in FIG. 4, and includes a central processing unit (CPU) 60, random access memory (RAM) 62, non-volatile random access memory (NVRAM) 64, flash memory (electronically-erasable programmable read-only memory or EEPROM) 66, read-only memory (ROM) 68, interfaces 70, a GPS device 72, and a console 74. CPU 60 is the workhorse of network router 18, carrying out the various program instructions embodying the router logic, and is connected to each of the other components. RAM 62 serves as temporary storage for a variety of program and data files, including an active router configuration file, routing tables, an address resolution protocol (ARP) cache for address mappings, routing programs, packet buffers for the data packets being transmitted, and a geo agent. NVRAM 64 stores backup and startup configuration files. Unlike RAM 62, content in NVRAM 64 is not lost when the router is powered down or restarted. Flash memory 66 holds the internetworking operating system (IOS) used to control initiation and operation of the router. Multiple versions of an IOS can be stored. ROM 68 contains a power-on self test (POST) and a bootstrap program to load the IOS. Interfaces 70 provide the network connections through which packets enter and exit the router. The interfaces can be attached to a motherboard of the router or connected as separate modules on modular routers. The interfaces can for example include WAN and LAN ports. Console 74 is used to directly control CPU 60 and ROM 68 for administrative functions. One of these administrative functions may be the ability to activate or deactivate the geodeclaration features.

Operation of network router 18 begins with the bootstrap program from ROM 68 which performs the POST and loads the IOS into RAM 62. Once the IOS is initialized, it looks for an active configurations file in NVRAM 64 and loads it. This file tells the router which programs to load (including the geo agent), and populates the routing tables and ARP cache. The primary routing program is used to control transmission of network data via interfaces 70. Leftover memory in RAM 62 is used as the buffer for processing incoming and outgoing packets.

Those skilled in the art will appreciate that network router 18 is only one example and alternative router designs could be used. The router might also be combined in a single device with other functionality, e.g., a modem.

As network router 18 is running, it checks incoming data to see if there is any associated geodeclaration metadata. This check can be part of the routing program or incorporated into the geo agent logic. If a geodeclaration is found, handling of the data is turned over to the geo agent before any data transmission. The geo agent can have reserved space in RAM 62 to temporarily hold the data until the geodeclaration is processed. The geo agent will first verify the geodeclaration data integrity with the trusted certificate authority. This verification can additionally include checking the data signature (e.g., checksum). Once the geodeclaration is verified, the geo agent determines whether network router 18 is allowed to process the data according to the rules present in the geodeclaration. This determination includes deciphering the geographic boundaries according to the particular format of the geodeclaration, and comparing the boundaries to a known location of network router 18. The current location of network router 18 may be obtained from GPS device 72, or may be programmed into network router 18 (e.g., in flash memory 66), or may be hardwired in network router 18. If the current location is within the permissible boundaries (or outside of prohibited boundaries) indicated by the geodeclaration, then the data is passed to the routing program for transmission. In some embodiments, the routing tables include geographic location information for respective routers, and network router 18 can perform an additional check to ensure that the next router in the path has a location which is also acceptable per the geodeclaration. The geodeclaration functionality is so repeated at each router along the transmission path.

While the geo agent has been described as a software module, it can alternatively be embodied as a plug-in, add-on, or separate hardware item, possibly one that is secured via advanced security techniques such as a trusted platform module.

As long as there is a permissible path through network 12, the electronic data from user device 12 will eventually end up at remote destination device 16. As noted above, destination device 16 could be another computer system similar to computer system 20. When the electronic data is received at destination device 16, it undergoes the same checks, i.e., destination device 16 will verify the authentication seal and any data signature, and confirm that the current location of destination device 16 is within permissible bounds according to the geodeclaration. Only after this confirmation destination device 16 allows the electronic data to be stored in a permanent storage device.

Figure 5:
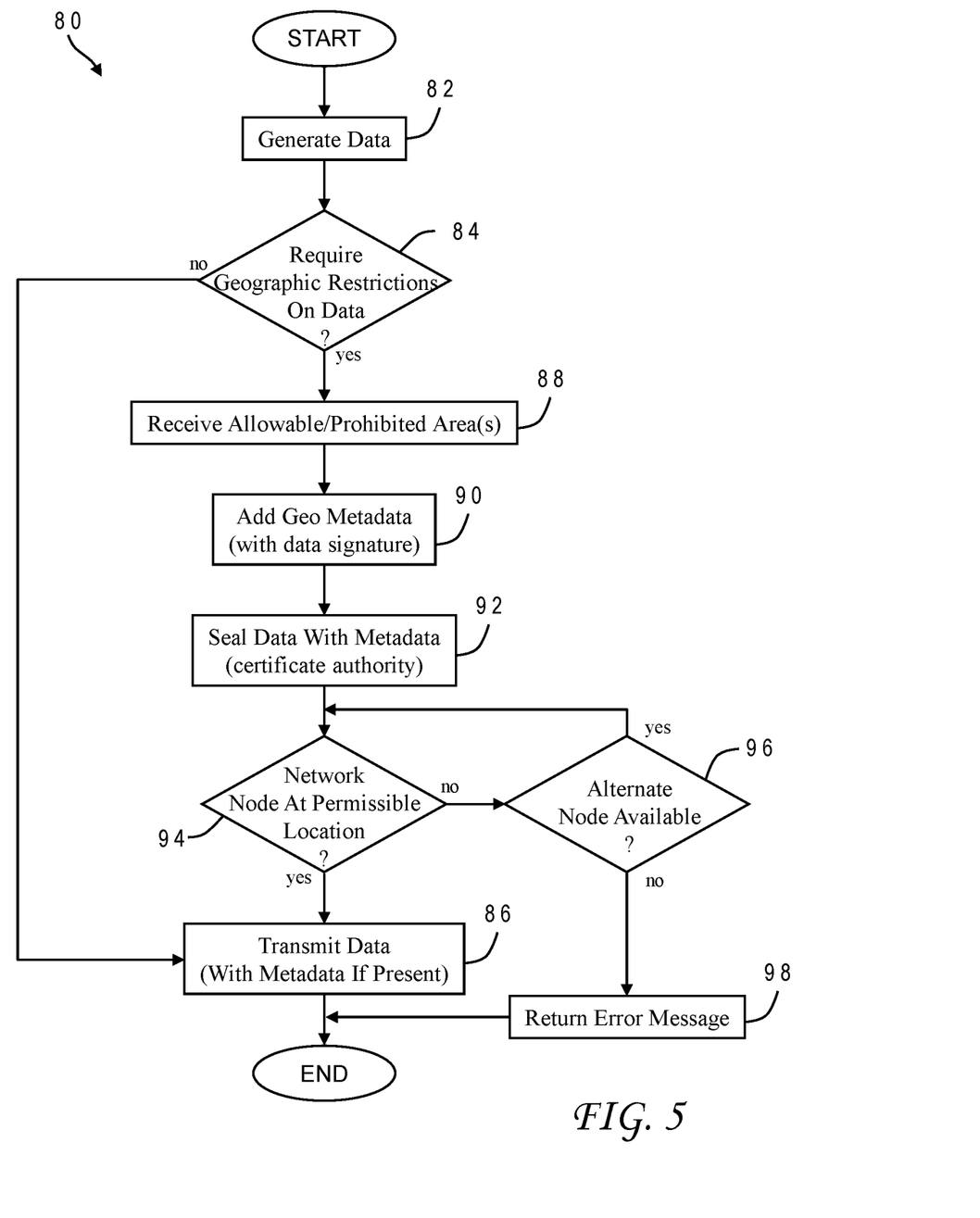
FIG. 5 is a chart illustrating the logical flow for a geodeclaration creation process carried out at a user computer system in accordance with one implementation of the present invention.
Figure 6:
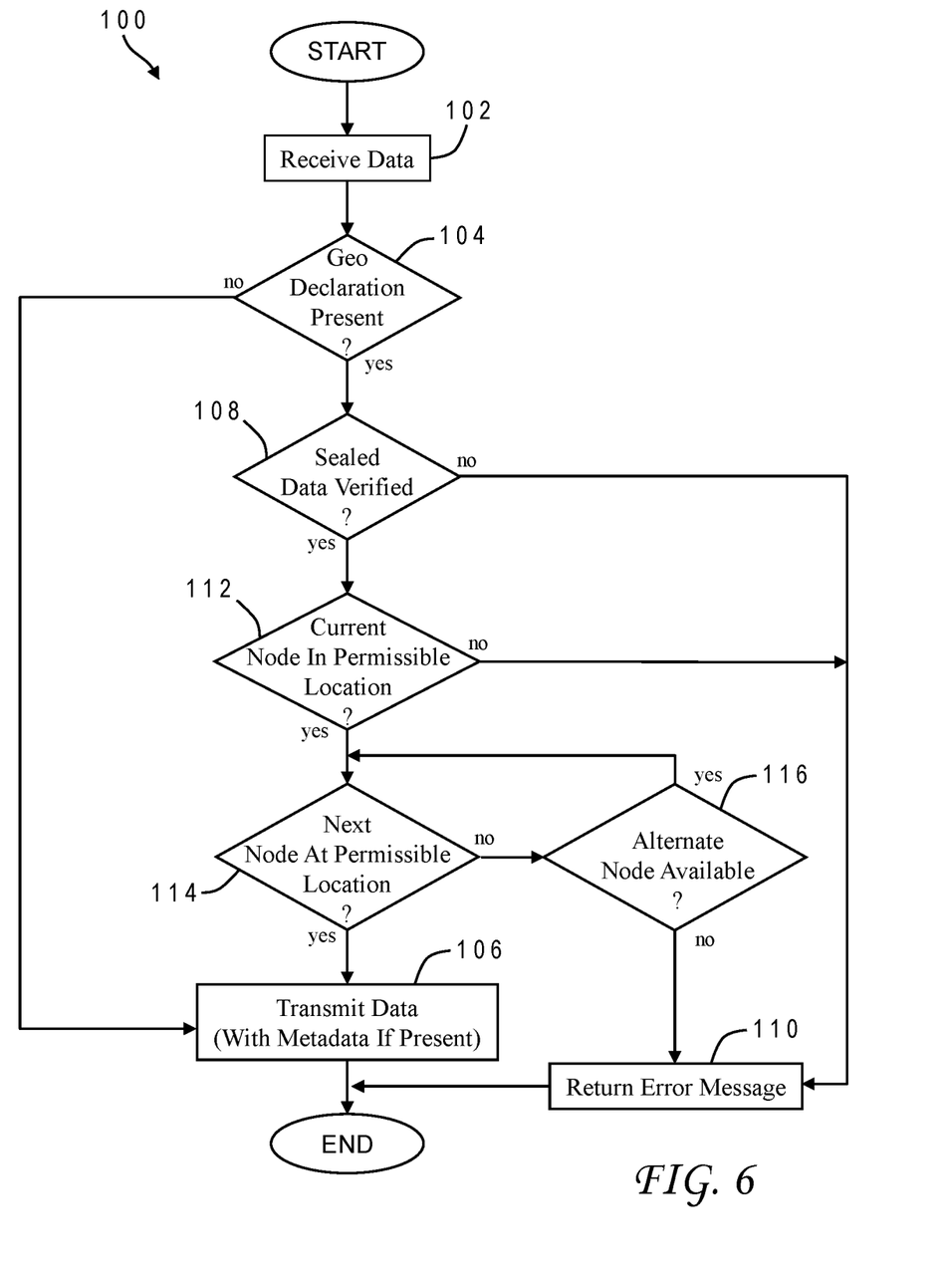
FIG. 6 is a chart illustrating the logical flow for a geodeclaration transmission process carried out at a network router in accordance with one implementation of the present invention.
Figure 7:
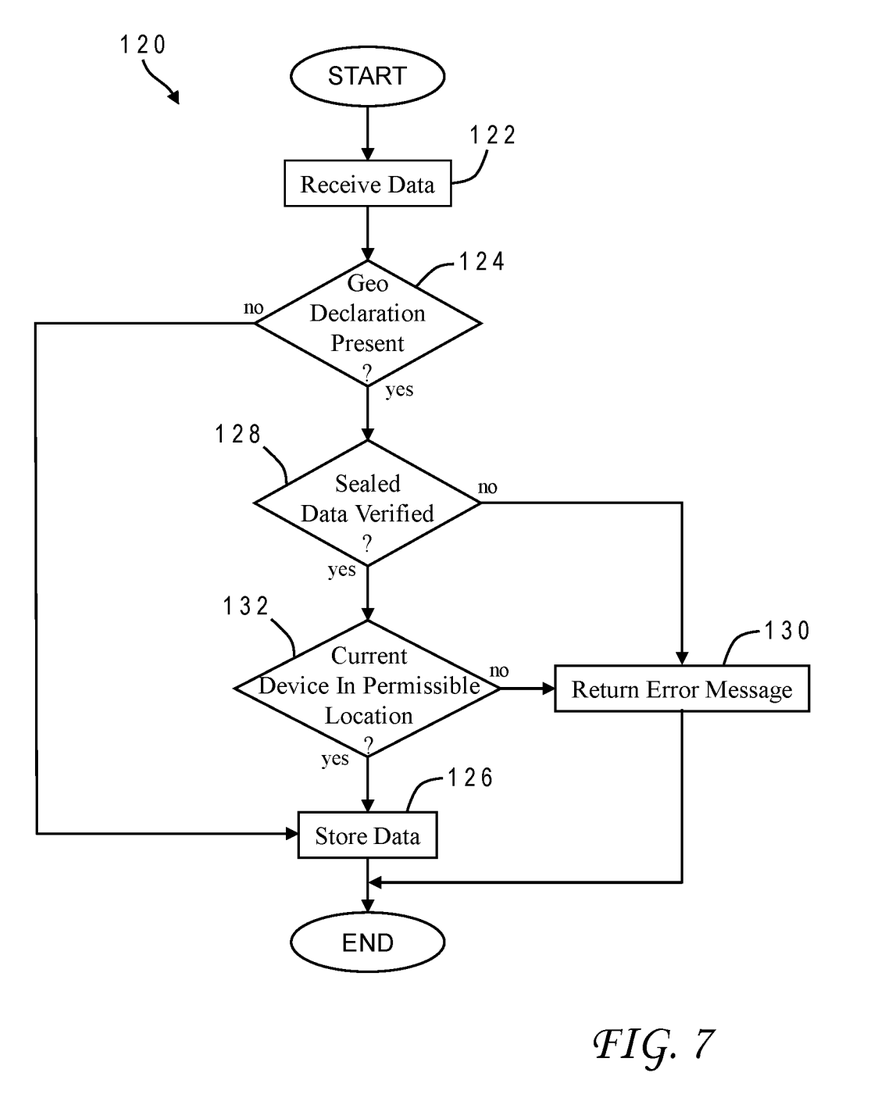
FIG. 7 is a chart illustrating the logical flow for a geodeclaration storage process carried out at a destination device in accordance with one implementation of the present invention.

The present invention may be further understood with reference to the charts of FIGS. 5-7 which illustrate the logical flow for different processes carried out at the user device, the network router, and the destination device, respectively, in handling the data with its associated geographic metadata. In FIG. 5, a geodeclaration generation process 80 is shown, and begins with the user device generating the original data 82. The system may prompt the user to ask whether geographic restrictions are to be placed on the data 84. If not, the process skips the geodeclaration steps and proceeds to transmit the data 86, and ends. If geographic restrictions are desired, the system receives the relevant parameters from the user 88. These parameters may be in the form of allowable areas, prohibited areas, or a combination thereof. The user device generates appropriate metadata based on the input areas and adds it (e.g., in the form of an XML statement) to the data 90. The metadata can also include error-checking information, i.e., a data signature. The electronic data and metadata are then sealed using an authentication technique 92. The sealed data/metadata can be transmitted at this point, but in this example the user device does a preliminary check to see if its gateway to the network (i.e., the closest network router) is within permissible geographic limits 94. This check can be performed as described above using available routing information; in an advanced implementation the user device can send a query to the gateway to obtain its current location. If the gateway is within permissible limits, the sealed data/metadata is transmitted 86. If not, the user device can look for an alternate gateway 96, repeatedly if necessary until a permissible node is found. If no node is found, the system can return an error message to the user 98. This message might include a prompt to allow the user to select a different storage destination.

FIG. 6 shows a geodeclaration transmission process 100 which may take place at a network router. Process 100 begins when the router receives the data to be transmitted 102. The router first checks to see if any geodeclaration is present with the data 104. If not, the process skips the geodeclaration steps and proceeds to transmit the data 106, and ends. If a geodeclaration is present, the router attempts to verify the sealed data integrity with the trusted CA 108. If the verification fails, an error message is returned 110. Further action may also be taken such as triggering an alarm and deleting the data. If the sealed data is verified, the router goes on to check whether the router itself is within a permissible location 112. If not, an error message is again returned 110. If the current node is in a permissible location the router can transmit the data, but in this example the router does a further check to see if the next network node (or the destination device if that is the next transmission node) is within permissible geographic limits 114. If not, the router can iteratively search for an alternate node 116 and check to see if the alternate node is in a permissible location. Once the validity of the next node in the transmission path is confirmed, the data is transmitted 106 and the process ends.

FIG. 7 shows a geodeclaration storage process 120 which may take place at the destination device. Process 120 again begins when the data is received from the network 122. The destination device will first check to see if a geodeclaration is present 124. If not, the data can be safely stored without further handling 126, and the process ends. If a geodeclaration is present, the destination device will attempt to verify the certificate for the sealed data 128. If the verification fails, an error message is returned 130. Further action may again be taken such as triggering an alarm and deleting the data. If the sealed data is verified, the destination device goes on to check whether the destination device itself is within a permissible location 132. If not, an error message is again returned 130. Only after the sealed data is verified and the location of the destination device is approved will the data be stored 126, and the process ends.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention could also be applied to satellites orbiting the Earth, in which case the geographical metadata might further include a z-axis (vertical) dimension. It is therefore contemplated that such modifications can be made without departing from the spirit or scope of the present invention as defined in the appended claims.

What is claimed is:

1. A method of controlling distribution of electronic data comprising:
generating the electronic data at a user computer system;
receiving a command at the user computer system to restrict geographic use of the electronic data;
responsive to the command, adding geographic metadata to the electronic data at the user computer system wherein the geographic metadata includes at least one geographic boundary defining a geographic area wherein the geographic area is a region in which the electronic data is allowed to be used;
securing the geographic metadata with the electronic data using a cryptographic seal at the user computer system such that a recipient device can verify authenticity of the geographic metadata;
transmitting the sealed electronic data and geographic metadata from the user computer system to the recipient device, wherein the recipient device is a network router and the sealed electronic data and geographic metadata are transmitted with destination information;
receiving the sealed electronic data and geographic metadata at the network router;
verifying authenticity of the cryptographic seal at the network router;
confirming that a physical location of the network router is within the geographic area; and
responsive to said confirming, transmitting the sealed electronic data and geographic metadata from the network router to the destination.

2. The method of claim 1 further comprising confirming by the user computer system that the recipient device has a physical location within the geographic area, wherein said confirming occurs before said transmitting.

3. The method of claim 1 wherein the geographic metadata includes an extensible markup language document having a verifiable signature for the electronic data.

4. The method of claim 1 wherein the cryptographic seal uses a digital certificate obtained from a certificate authority.

5. The method of claim 1 wherein the geographic metadata includes multiple geographic boundaries defining multiple separate geographic areas.

6. A computer network comprising:
a user computer system that generates electronic data, receives a command to restrict geographic use of the electronic data, responsively adds geographic metadata to the electronic data wherein the geographic metadata includes at least one geographic boundary defining a geographic area in which the electronic data is allowed to be used, secures the geographic metadata with the electronic data using a cryptographic seal, and transmits the sealed electronic data and geographic metadata;
at least one network router that receives the sealed electronic data and geographic metadata with destination information from said user computer system, verifies authenticity of the cryptographic seal, confirms that a physical location of said network router is within the geographic area, and responsively transmits the sealed electronic data and geographic metadata according to the destination information; and a destination device that receives the sealed electronic data and geographic metadata from said network router, verifies authenticity of the cryptographic seal, confirms that a physical location of said destination device is within the geographic area, and responsively stores the electronic data at said destination device.

7. The computer network of claim 6 wherein the geographic metadata includes an extensible markup language document having a verifiable signature for the electronic data.

8. The computer network of claim 6 wherein the cryptographic seal uses a digital certificate obtained from a certificate authority.

9. The computer network of claim 6 wherein said network router has a global positioning system, and the physical location of said network router is confirmed by determining that current geographical coordinates from the global positioning system are within the geographic area.

10. The computer network of claim 6 wherein the geographic metadata includes multiple geographic boundaries defining multiple separate geographic areas.

11. The computer network of claim 6 wherein said network router has an embedded geo agent which determines that the geographic metadata is associated with the electronic data.

* * * * *